(12) United States Patent
Katkar

(10) Patent No.: US 7,945,955 B2
(45) Date of Patent: May 17, 2011

(54) VIRUS DETECTION IN MOBILE DEVICES HAVING INSUFFICIENT RESOURCES TO EXECUTE VIRUS DETECTION SOFTWARE

(75) Inventor: Sanjay Sahebrao Katkar, Pune (IN)

(73) Assignee: Quick Heal Technologies Private Limited, Pune, Maharastra (IN)

( * ) Notice: Subject to any disclaimer, the term of this patent is extended or adjusted under 35 U.S.C. 154(b) by 916 days.

(21) Appl. No.: 11/853,071

(22) Filed: Sep. 11, 2007

(65) Prior Publication Data
US 2008/0148407 A1 Jun. 19, 2008

(30) Foreign Application Priority Data
Dec. 18, 2006 (IN) .......................... 2073/MUM/2006

(51) Int. Cl.
G06F 11/30 (2006.01)
(52) U.S. Cl. .......................................... 726/22; 713/188
(58) Field of Classification Search .................... 713/188
See application file for complete search history.

(56) References Cited

U.S. PATENT DOCUMENTS

| | | |
|---|---|---|
| 6,272,545 B1 | 8/2001 | Flanagin et al. |
| 6,663,420 B1 | 12/2003 | Xiao |
| 6,842,861 B1 | 1/2005 | Cox et al. |
| 2002/0042886 A1* | 4/2002 | Lahti et al. ............... 713/201 |
| 2003/0120951 A1 | 6/2003 | Gartside et al. |
| 2003/0162575 A1* | 8/2003 | Morota et al. ............ 455/575 |
| 2003/0182435 A1 | 9/2003 | Redlich et al. |
| 2003/0188189 A1 | 10/2003 | Desai et al. |
| 2004/0064737 A1* | 4/2004 | Milliken et al. .......... 713/201 |
| 2004/0236874 A1 | 11/2004 | Largman et al. |
| 2005/0044418 A1 | 2/2005 | Miliefsky |
| 2005/0097199 A1 | 5/2005 | Woodard et al. |
| 2005/0240910 A1 | 10/2005 | Radatti et al. |
| 2006/0080491 A1 | 4/2006 | Uchizono et al. |

(Continued)

FOREIGN PATENT DOCUMENTS

GB  2385689 A  8/2003

(Continued)

OTHER PUBLICATIONS

Nash et al., "Towards an Intrusion Detection System for Battery Exhaustion Attacks on Mobile Computing Devices", 2005, IEEE, pp. 1-5.*

(Continued)

*Primary Examiner* — Matthew B Smithers
(74) *Attorney, Agent, or Firm* — Narendra Reddy Thappeta

(57) ABSTRACT

A virus scanning system which scans a mobile device/mobile device for files containing viruses even if the files are not executable on the mobile device. Corrective actions such as removing the files can be performed once the viruses are detected. As a result, viruses which are not executable (as being designed for other mobile device types) can also be detected and removed from mobile devices. According to another aspect, a common interface is provided when a virus scanning program requests data from mobile devices, and the computer is provided with different remote application programming interfaces suited to retrieve the specified data from the corresponding mobile devices. As a result, the computer can be extended to integrate scanning of new device types easily. According to one more aspect, a scanning program retrieves only data portions required for continuing the scan operation. According to yet another aspect, the program modules and virus definitions for scanning are received from a server on a network.

11 Claims, 12 Drawing Sheets

U.S. PATENT DOCUMENTS

| | | | |
|---|---|---|---|
| 2006/0161985 A1 | 7/2006 | Zhao | |
| 2006/0236393 A1* | 10/2006 | Kramer et al. | 726/23 |
| 2007/0240222 A1* | 10/2007 | Tuvell et al. | 726/24 |
| 2008/0086776 A1* | 4/2008 | Tuvell et al. | 726/24 |
| 2008/0178294 A1* | 7/2008 | Hu et al. | 726/24 |

FOREIGN PATENT DOCUMENTS

| | | |
|---|---|---|
| WO | 2006012014 A2 | 2/2006 |

OTHER PUBLICATIONS

Venugopal, Deepak, "An Efficient Signature Representation and Matching Method for Mobile Devices", Aug. 2-5, 2006, ACM, pp. 1-9.*

Venugopal et al., "Intelligent Virus Detection on Mobile Devices", Oct. 30-Nov. 1, 2006, ACM, pp. 1-4.*

"A. Sulaiman, K. Ramamoorthy, S. Mukkamala and A. H. Sung", Malware Examiner using Disassembled Code (MEDIC), Institute for Complex Additive Systems Analysis, New Mexico Tech Socorro, New Mexico 87801, Year 2005, IEEE, pp. 428-429.

"BULLGUARD releases first multi-platform Mobile Anti-virus retail pack", 3GSM World Congress, Barcelona, Year Feb. 13, 2006, pp. 1-2.

"NOKIA" S60 Platform SDK for Symbian OS, for C++, 2006, pp. 1-4.

"NOKIA" Series 40 Developer Platform 2.0 SDK, Nokia 6230i Edition, 2005, pp. 1-106.

* cited by examiner

| | |
|---|---|
| CeRapiInit | This function attempts to initialize the Windows CE remote application programming interface (RAPI). |
| CeFindFirstFile | This function searches a directory for a file whose name matches the specified filename. |
| CeFindClose | This function closes the specified search handle. |
| CeCopyFile | This function copies an existing file to a new file. |
| CeDeleteFile | This function deletes an existing file from the object store. |
| CeCreateFile | This function creates, opens, or truncates a file, pipe, communications resource, disk device, or console. |
| CeReadFile | This function reads data from a file, starting at the position indicated by the file pointer. |
| CeWriteFile | This function writes data to a file. |
| CeSetFilePointer | This function moves the file pointer of an open file. |
| CeCloseHandle | This function closes an open object handle. |
| CeGetFileAttributes | This function returns attributes for a specified file or directory. |
| CeSetFileAttributes | This function sets a file's attributes. |
| CeGetFileSize | This function retrieves the size, in bytes, of the specified file. |
| CeGetFileTime | This function retrieves the date and time that a file was created, last accessed, and last modified. |
| CeSetFileTime | This function sets the date and time that a file was created, last accessed, or last modified. |
| CeCloseHandle | This function closes an open object handle. |

FIG. 5

VIRUS DETECTION IN MOBILE DEVICES HAVING INSUFFICIENT RESOURCES TO EXECUTE VIRUS DETECTION SOFTWARE

RELATED APPLICATIONS

The present application claims priority from the following pending Indian patent application, which is incorporated in their entirety into the present application: application Ser. No.: 2073/MUM/2006, filed on Dec. 18, 2006, naming as inventor Sanjay Sahebrao Katkar, entitled, "VIRUS DETECTION IN MOBILE PHONE TYPE DEVICES IN WHICH VIRUS DETECTION SOFTWARE IS EXECUTED EXTERNALLY"

BACKGROUND

1. Field of the Invention

The present invention relates generally to virus detection systems, and more specifically to a method and apparatus for detecting viruses in mobile phones type devices in which virus detection software is executed externally.

2. Related Art

Virus detection software refers to program(s) which scan (examine) data on a target device for existence of any viruses on the target device. A virus generally refers to a software code/data which gets installed on target devices (often without the knowledge of the user of the target device) and is often in the form of (part of a) a file present on the non-volatile memory. The file can be executable (in which case processing resources can be wasted or features otherwise available on the target device may be impacted) or mere data wasting storage resources on the target device.

There are several scenarios in which virus detection software is executed external to the target device being scanned. For example, virus detection software is often executed on a computer system to scan mobile phone type devices such as mobile phones, PDAs etc., (example target devices), often since such types of devices have insufficient resources (storage and/or processing capacity) to execute virus detection software.

Such target devices are increasingly vulnerable to virus attacks. For example, mobile phones are increasingly being provided with features such as ability to access electronic mail and world-wide web, multi-media messaging services (MMS), games, short message services (SMS), desktop applications, etc. Due to such connectivity applications, mobile phones (or mobile devices, in general) are increasingly more vulnerable to virus attacks. Furthermore the virus can spread from one mobile phone to another, thereby infecting additional mobile phones. Accordingly, it is generally desirable to at least detect the presence of the viruses on mobile phones.

According to one prior approach, detection of viruses in a mobile device is performed by connecting the mobile device to a computer (having relatively larger memory and processing power) and running a virus scan software in the computer. In one embodiment, different virus scanning software programs are implemented for corresponding operating environments (e.g., operating system or model of the mobile phone) on the computer. Such a fragmented approach leads to several inefficiencies such as increased cost of development, potentially not detecting files of viruses which are designed for other operating environments, etc.

BRIEF DESCRIPTION OF THE DRAWINGS

The present invention will be described with reference to the accompanying drawings, which are described below briefly. In the drawings, like reference numbers generally indicate identical, functionally similar, and/or structurally similar elements. The drawing in which an element first appears is indicated by the leftmost digit(s) in the corresponding reference number.

FIG. 5 is a example set of function calls according to a software development kit (SDK) provided by a vendor of a mobile phone type in one embodiment.

DETAILED DESCRIPTION

Overview and Discussion of the Invention

A virus scanning program provided according to an aspect of the present invention scans a mobile device (e.g., mobile phone) for files containing viruses even if the files are not executable on the device. Corrective actions such as removing the files can be performed once the viruses are detected. As a result, viruses which are not executable (as being designed for other device types) can also be detected and removed from the devices. Further, cost/effort of procuring and loading (copy of) virus scan program into each mobile device is avoided.

According to another aspect, a common interface is provided when a virus scanning program requests data from mobile devices, and the computer is provided with different remote application programming interfaces suited to retrieve the specified data from the corresponding devices. As a result, the computer can be extended to integrate scanning of new device types easily.

According to one more aspect, a scanning program retrieves only data portions required for continuing the scan operation. Thus, the scan operation can be completed without copying the entire file locally to the computer on which the scanning program is executed.

According to yet another aspect, the program modules and virus definitions for scanning are received from a server on a network.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

Example Environment

Figure 1:
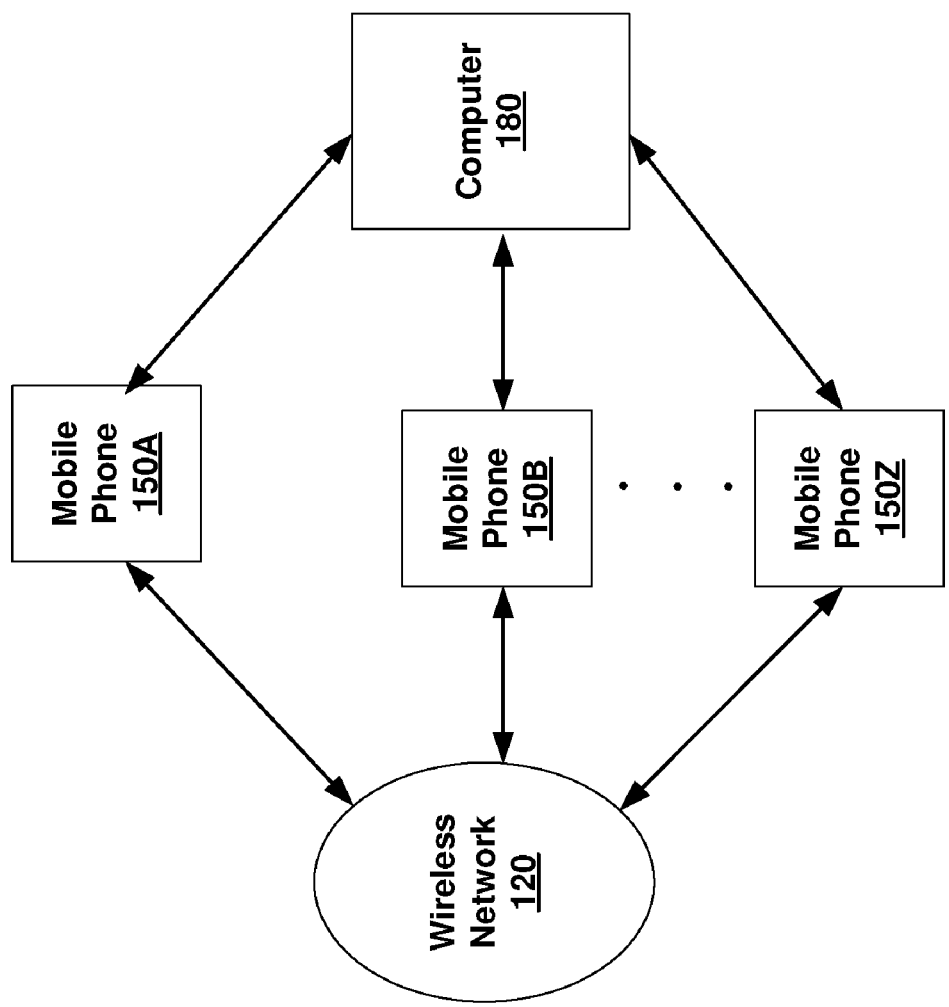
FIG. 1 is a block diagram illustrating an example environment in which several aspects of the present invention can be implemented.

FIG. 1 is a block diagram illustrating an example environment in which several aspects of the present invention can be implemented. The block diagram is shown containing mobile phones (example mobile devices) 150A_150Z, personal computer 180, and wireless network 120. Each block is described below in further detail.

Wireless network 120 provides connectivity between mobile phones 150A_150Z using various standards such as GSM, CDMA etc. Each mobile phone 150A_150Z transfers voice signal and/or data according to the protocol defined by the corresponding standards. Each mobile phone may also be provided with ability to communicate using technologies such as USB connection, Infra Red, Bluetooth and WiFi or wired LAN connection to communicate with other devices/systems.

Personal computer (PC) 180 provides a platform on which virus scan software (implemented according to an aspect of the present invention) can be executed and mobile phones 150_150Z can be scanned for viruses. In addition, PC 180 may facilitate operations such as configuring mobile phones, uploading a new application providing a new feature, configuring the present settings, uploading a phonebook data, and operation of the mobile phones through graphical user interface provided in the PC (using an appropriate physical/protocol interface provided to the corresponding mobile phone, as is well known in the relevant arts).

Mobile phones 150A_150Z enable telephone calls to be made/received using wireless network 120. Each mobile phone may have a corresponding different operating environment (operating system such as Symbian OS from Symbian Ltd., WIN Ce from Microsoft Corporation, and modifications to such operating systems as suited for different model of the mobile devices, etc). Each mobile phones 150A_150Z runs a desired application providing features such as multimedia accessing, web application, file transfer massaging services etc. Mobile phones communicate and exchange data using wireless network 120. The data exchange may be in the form of messages SMS, MMS, and other data exchange features provided by the corresponding network standard noted above.

Mobile phones 150A_150Z receives viruses through MMS, SMS, Blue Tooth connection etc. The viruses while propagating may land up (or infects) a mobile phone that is having different operating environment. Such viruses may not be able to spread further from the corresponding mobile since, it is designed to be executed on a particular type of operating environment (for a virus to spread further it needs to execute itself in the mobile to spread to other mobile phones). Thus, the virus file may remain saved on the mobile phone as it is.

The manner in which the virus detection is performed (including detection of such unwanted files) using PC 180 is described below in further detail.

Virus Detection

Figure 2:
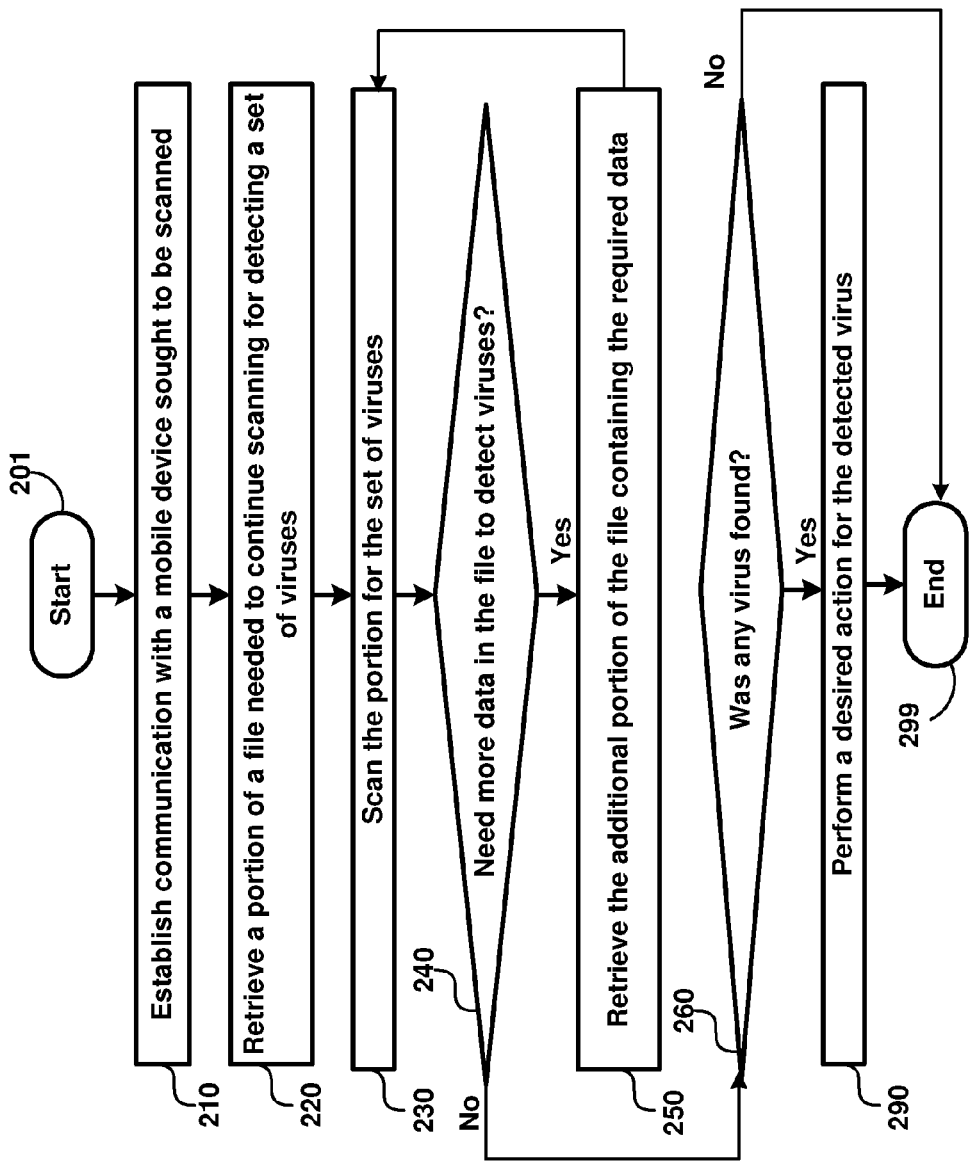
FIG. 2 is a flow chart illustrating the manner in which virus detection is performed in mobile phones according to an aspect of the present invention.

FIG. 2 is a flow chart illustrating the manner in which virus detection is performed in mobile phones according to an aspect of the present invention. The flow chart is illustrated with respect to FIG. 1 merely for illustration. However the flow chart can be implemented in other environments as well, as will be apparent to one skilled in the relevant arts by reading the disclosure provided herein. Many of such implementations are contemplated to be covered by various aspects of the present invention. The flow chart begins in step 201, in which control passes to step 210.

In step 210, computer 180 establishes communication with a mobile device/mobile phone sought to be scanned. Communication may be established by connecting the mobile phone to the PC on a physical port such as USB, RS232, and proprietary physical/protocol interfaces, etc. Various software modules (e.g., drivers) may be run in the mobile phone to facilitate access to the content in the mobile phone based on (or inherent to) the provided communication.

In step 220, computer 180 retrieves a portion of a file needed to continue scanning for detecting a set of viruses. In general, a designer of the scan program chooses the set of viruses to scan (can be a single virus or more), and the nature/format of the data representing the viruses determines the amount of data and the location of the data in the files that is required to continue scanning. Thus, a designer of the scanning program needs to understand the content of the virus files to determine the specific location in the file and the amount of data required.

As described in sections below, the file portion may be retrieved using API functions provided for each mobile phones for accessing the data. The API function may retrieve the data from a specified location. In one embodiment, header portion of the file is retrieved first. The retrieved portion may be stored in a buffer.

In step 230, computer 180 scans the portion for the set of viruses. Scanning may be performed consistent with the understanding of the nature/format of data representing the set of viruses, and can be performed in a known way. Computer 180 may compare the content of the buffer with a already available strings (sequence of binary bytes in one embodiment) to determine (some conditionally) the presence of a corresponding virus. For example, a file header may be compared with known file header formats and each corresponding field in the file header may be checked for file type, size, etc. Based on file type (determined by the contents of the header), the set of viruses to scan the corresponding file may be determined. Also based on the file type and certain header bytes, the portion of the file and the amount of bytes/data to be scanned for viruses may be determined.

In step 240, computer 180 determines if more data is needed in the file to detect any of the set of viruses. For example, based on the content of the header or the portion of the file thus far examined, computer 180 may determine if additional portion is needed to detect the set of viruses. As an illustration, one type of virus may attach itself towards the end of the content in an executable file and accordingly the end portion may be determined to be such additional portion. If additional portion is needed, control transfers to step 250 else to step 260.

In step 250, computer 180 retrieves the additional portion of the file containing the required data and control passes to step 230. The additional portion from the specified location may be retrieved again using API calls as described in the examples scenarios in sections below. With reference to above example, computer 180 may retrieve the end portion of an executable file as additional portion.

In step 260, computer 180 determines whether any virus was found, based on the data scanned thus far for a file. Again the content of the retrieved data may be compared with pre-specified data in making such a determination. If the determination indicates the presence of a virus, control passes to step 290, or else to step 299.

In step 290, computer 180 performs a desired action for the detected virus. For example, computer 180 may delete the portion determined to be containing the virus or the entire file. The flow chart ends in step 299.

Due to the above described approach, viruses can be detected while retrieving limited data (instead of entire file) from mobile phones. In addition, the flow chart of FIG. 2 can be repeated for different sets of viruses, potentially designed only for execution on other (i.e., not the one implemented in the present phone being scanned) operating environments as described in further detail in sections below.

The description is continued with respect to the details of an example embodiment of mobile device 150A, which supports the above described features of computer 180.

Mobile Phone

Figure 3:
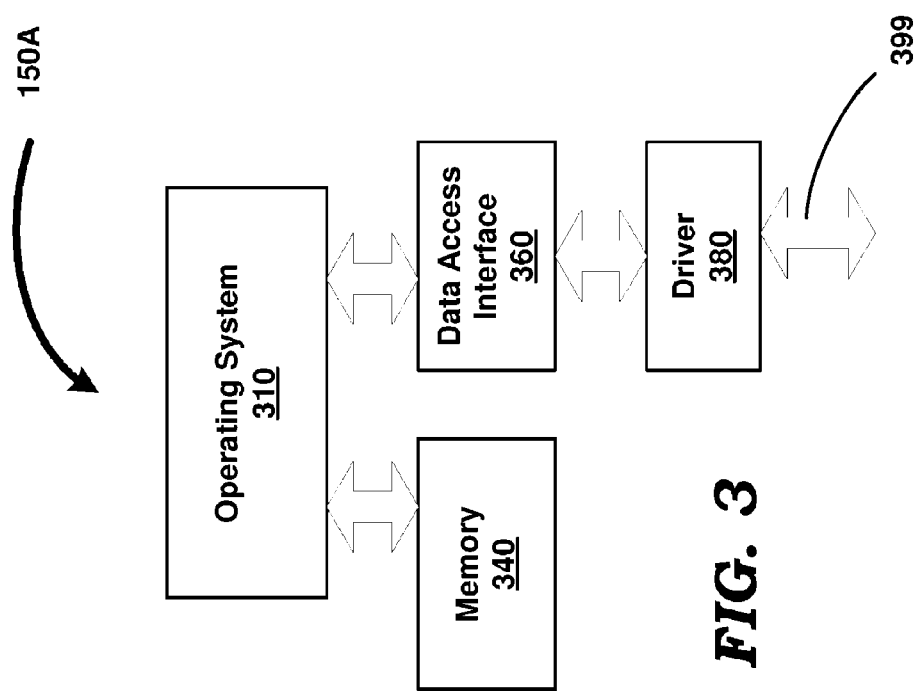
FIG. 3 is a block diagram representing various functional blocks in an embodiment of a mobile phone.

FIG. 3 is a block diagram representing various functional blocks in an embodiment of mobile phone 150A. The block diagram is shown containing operating system 310, memory 340, data access interface 360 and driver 380. Each block is described below in further detail.

Driver 380 provides electrical/physical and protocol interfaces using which bits of data can be transmitted and received to/from computer 180. The interfaces may specify various aspects such as signal levels, bit rates, command/interchange requirements, etc., consistent with the specific interface implementations employed in computer 180. Path 399 may be of type USB, Serial port, Ethernet, etc. The extracted data (during reception) is provided to file access interface 360 using any of the data transfer technique. Similarly, driver 380 transmits data received from file access interface 360.

Operating system 310 may control access to and allocate various resources (available within mobile phone 150A) to various entities (user applications, file access interface, etc.) executing in mobile phone 150A. Different mobile phones can be implemented with different operating systems (potentially provided by same/different vendors) and the noted entities are generally designed consistent with the interface provided by operating system 310 to access the desired resources.

Data access interface 360 represents set of program interfaces for accessing data from memory 340. Data access interface 360 receives a request or command from driver 380 and performs requested operation such as opening a file, retrieving desired portion of the data (either of a file or previously stored MMS/SMS) from memory 340, write data into memory 340, etc., and performs the corresponding action by interfacing with operating system 310. Data access interface 360 may be interfaced to driver 380 using various service routines (interrupt service routines, pipes, etc.,) supported in operating system 310 (though not shown), as is well known in the relevant arts.

Memory 340 may store data in various formats and provide access for writing and reading the data in the corresponding format. For example, memory 340 may store some data (representing pre-specified images, program files representing operating system portions or user applications, etc.) in a file system format (structure) as individual files and facilitate data access through various file access program interface.

The data representing SMS, MMS etc., may also be stored as files. For example, all SMS may be stored in one file or each SMS may be stored in an individual file. APIs are often provided to access an individual or group of messages from such file formats, and may thus be used for scanning.

Memory 340 may also contain viruses written/designed for operating system 310 and also viruses designed for operating system other than 310. The manner in which all such viruses in memory 340 may be detected in PC 180 is described below with reference to FIG. 4.

Computer System

Figure 4:
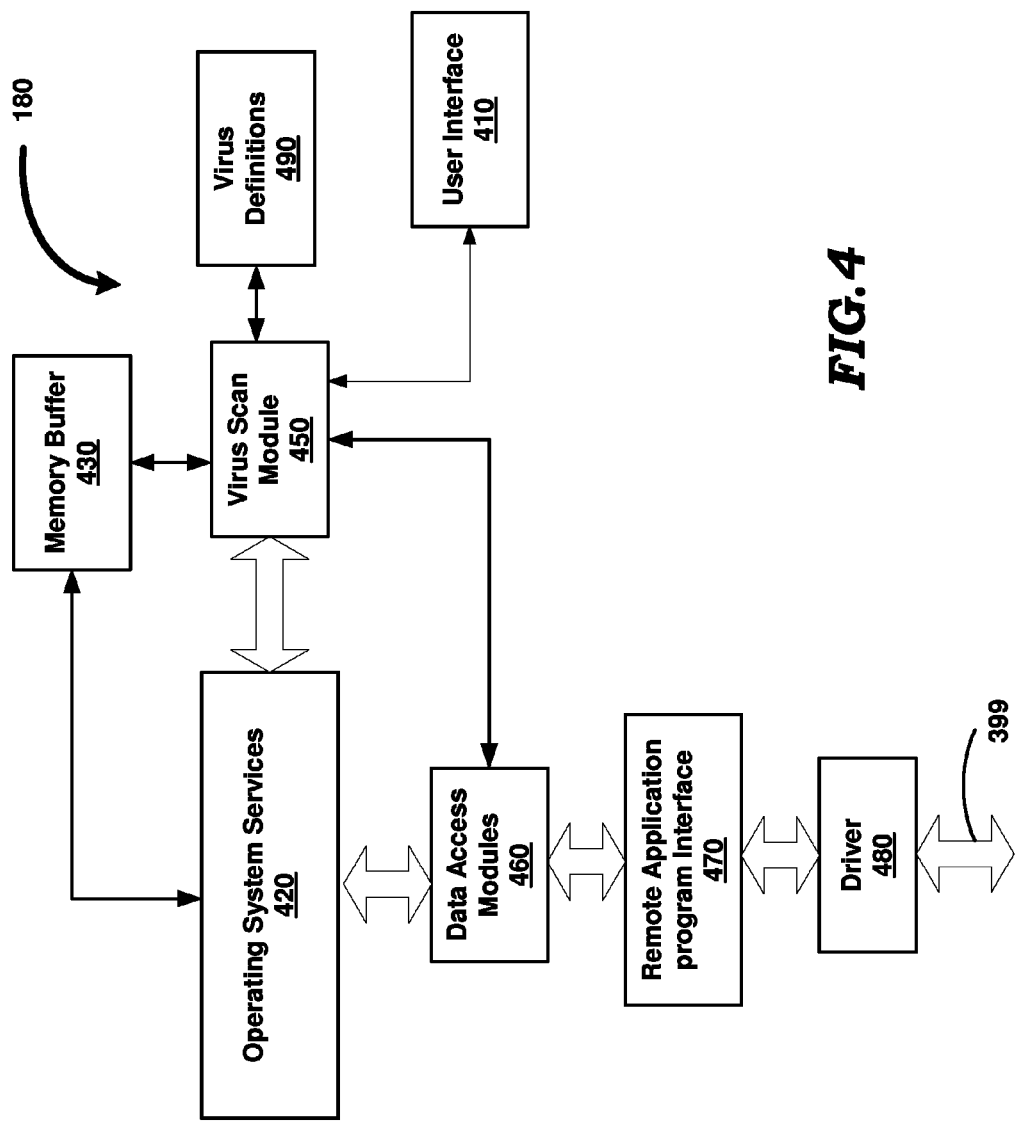
FIG. 4 is a block diagram depicting various functional blocks in a computer illustrating the manner in which viruses can be detected in an embodiment of the present invention.

FIG. 4 is a block diagram depicting various functional blocks in PC 180 illustrating the manner in which viruses can be detected in an embodiment of the present invention. The block diagram is shown containing operating system services 420, memory buffer 430, virus scan module 450, data access modules 460, remote application program interface (RAPI) 470, driver 480, and virus definitions 490. Each block is described below in further detail.

User interface 410 may provide an interface to a user for monitoring the status of scan operation as well as provide any necessary inputs. For example, virus scan program 450 may prompt the user to input data for confirming operations such as delete, modify scan, etc.

Driver 480 operates similar to and cooperatively with driver 380 described above. Driver 480 transmits on path 399 the requests for desired data portions received from RAPI 470, and receives the requested data in response. The received data is provided to remote application program interface (RAPI) 470.

Remote application program (RAPI) 470 represents a set of program logic (code corresponding to functions or procedures) to generate command strings to access memory 340. The program logics are implemented compliant with the requirements of program logic in data access interface 360. Often RAPI for each mobile phone is provided by the mobile phone vendor for accessing mobile phones through PC 180.

Example set of program logics (functions) are listed in FIG. 5. The set of program logics are provided for mobile phone with Window CE based operating environment. Each row contains a function call in first column (530) and description of the action performed by the corresponding function call in second column (560). For example, details in row 521 indicates a function call "CeReadFile" and the corresponding action indicate that the function reads the data from a file starting at the position indicated by the file pointer. The remaining rows are not described in the interest of conciseness.

Continuing with respect to FIG. 4, data access modules 460 invokes the program logics (e.g., corresponding to the functions of FIG. 5) in RAPI 470 to retrieve a desired portion of data requested by virus scan module 450. The data received in response is stored in memory buffer 430 by interfacing with operating system services 420. In addition to data retrieval, data access module 460 may also enable virus scan module 450 to perform actions such as delete file, write to a file, etc., by interfacing with RAPI 470.

Virus definitions 490 may contain data strings or other suitable logic which identify each virus type. The set may contain strings representing viruses executable on all possible operating environments. Though not shown in the Figure, the definitions can be updated periodically as more viruses are discovered.

Virus scan program 450 detects viruses in mobile phone 180A according to an aspect present invention. Virus scan program 450 interfaces with data access module 460 for retrieving file/data in mobile phone 180. Virus scan program 450 may operate in accordance with FIG. 2 described above in retrieving only portions of data as required for detecting a set of viruses chosen for each iteration. However, alternative approaches (e.g., copying the entire file to local storage) may be employed without departing from the scope and spirit of several aspects of the present invention.

According to an aspect of the present invention, virus definitions 490 contains the definitions of all viruses, whether executable in specific operating environment (mobile device type) or not. Accordingly, virus scan program 450 can scan each mobile device for all known viruses, irrespective of whether the data/file corresponding to the virus is executable or not on the specific mobile device. Once virus data/files are detected, a suitable action such as deleting the data/file can be performed to free up storage space on the target mobile device (scanned).

According to another aspect of the present invention, an approach is chosen which facilitates the virus scan program to easily scan mobile devices of different operating environments, as described below in further detail.

Scanning Mobile Devices of Different Operating Environments

Figure 6:
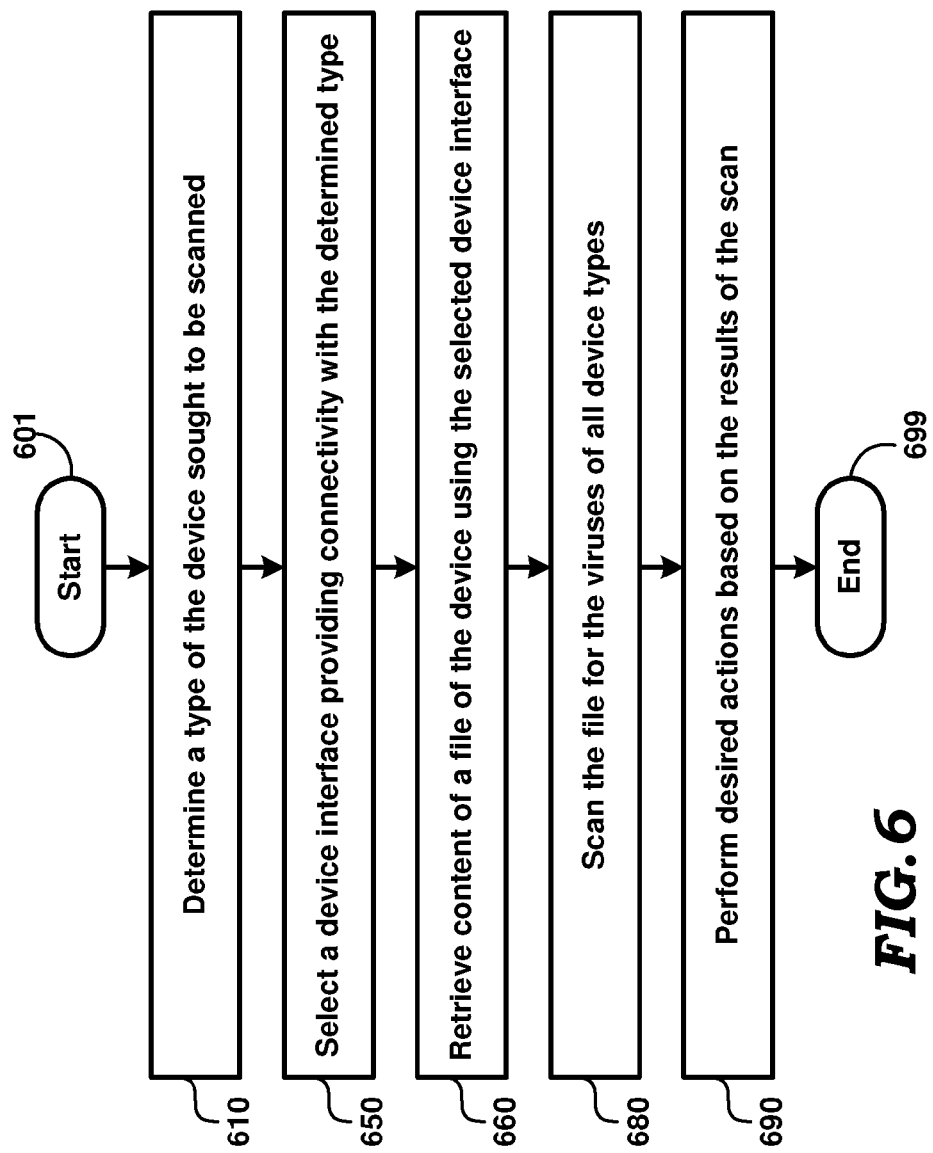
FIG. 6 is a flow chart illustrating the manner in which mobile phones of different operating environments (or types) can be scanned according to an aspect of the present invention.

FIG. 6 is a flow chart illustrating the manner in which mobile devices of different operating environments can be scanned according to an aspect of the present invention. The flow chart is illustrated with reference to FIGS. 1 and 2 merely for illustration. However the flow chart may be implemented in other environments as well, as will be apparent to one skilled in the relevant arts by reading the disclosure provided herein. Many of such implementations are contemplated to be covered by several aspects of the present invention. The flow chart begins in step 601 and control passes to step 610.

In step 610, computer 180 determines a type of the mobile device sought to be scanned. The mobile device may be configured to communicate the ID upon establishment of the connection with the PC 180, and the type may be determined based on the received ID. Alternately, a user may provide the corresponding information through appropriate user interface (graphical display, key board, etc., as represented by user interface 410).

In step 650, computer 180 selects a device interface providing connectivity with the determined type. The set of interface programs providing connectivity with the corresponding device types may be stored in a local memory. In one embodiment, a set of program modules are provided by the mobile device vendor in the form of SDK (software development kit). The SDK contains a set of application program interface (APIs), and the appropriate API can be selected based on the determined device type.

New set of library (APIs) and drivers may be added with the help of SDK to support a new model of mobile devices. Such new set of API are often provided by the corresponding mobile device vendors along with the mobile device. The user using the mobile device connected to PC may install appropriate drivers provided by the device vendor.

In step 660, computer 180 retrieves the content of a file of the device using the selected device interface. Corresponding API may be used to retrieve desired content (portion) of the file. The retrieved portion may be stored in a local buffer for scanning. The approach of FIG. 2 can be used to retrieve only portion of the file. Alternatively, the file/data can be copied locally before scanning the data for virus.

In step 680, computer 180 scans the file for the viruses of all device types consistent with the definitions in virus definitions 490. Scanning of the retrieved content may be performed using any of the scanning technique. In step 690, computer 180 performs desired actions (e.g., deleting, repairing, or cleaning of the file if infected with virus) based on the results of the scan. The flow chart ends in step 699.

Thus, by integrating different SDKs into computer 180, multiple mobile device types can be easily scanned using a single virus scan program. In addition, since the virus definitions can contain information of all types of the viruses, any type of virus even if its designed for different mobile operating environment can be reliably detected and removed from mobile devices.

Another aspect of the present invention facilitates easier integration of additional mobile device types by having the scan program use a common interface to interface with the various SDKs as described below in further detail.

Example Architecture

Figure 7:
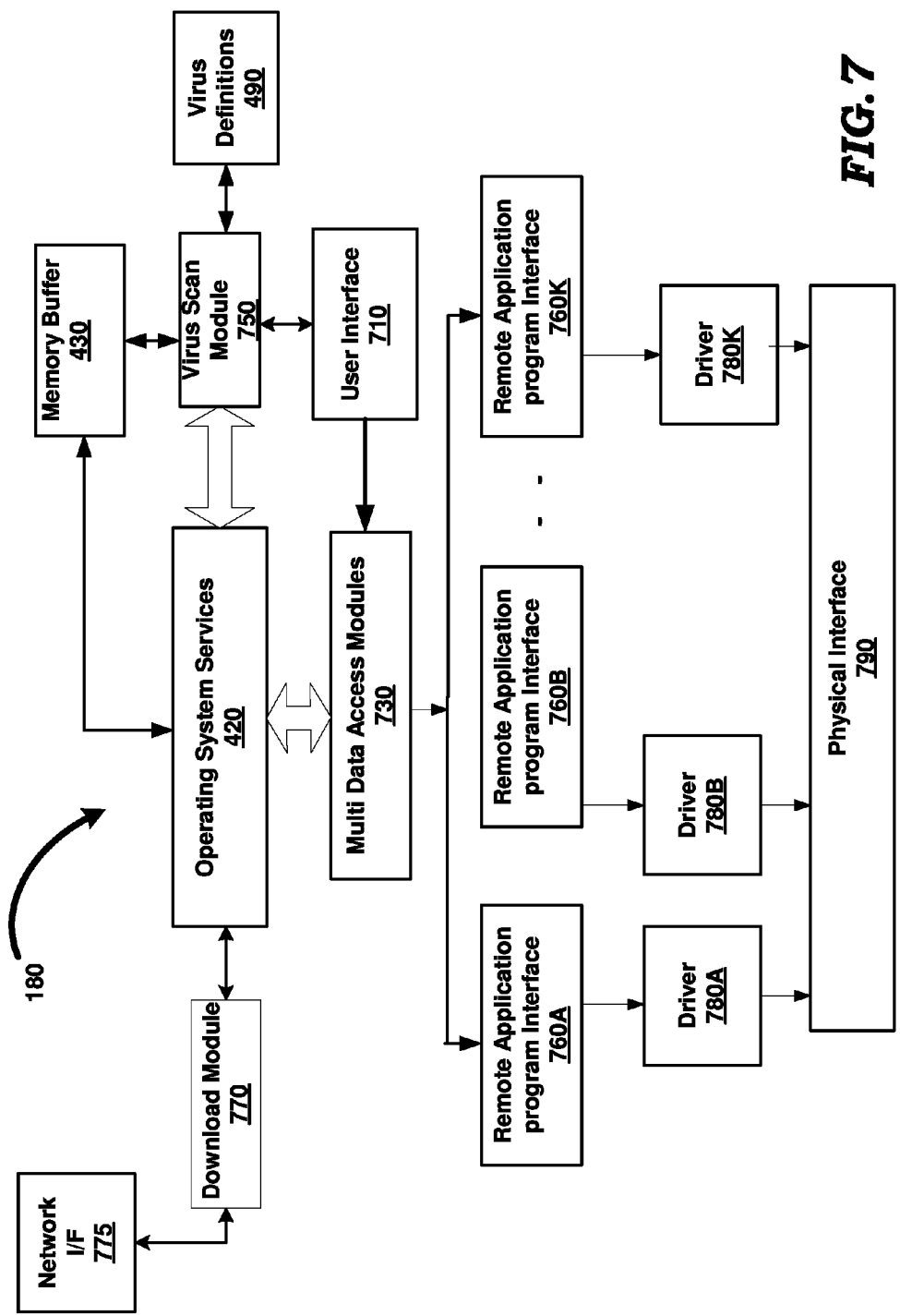
FIG. 7 is a block diagram illustrating the manner in which a virus scan program can scan different mobile phone types in an embodiment of the present invention.

FIG. 7 is a block diagram illustrating the manner in which a virus scan program scans different mobile devices in an embodiment of the present invention. The block diagram is shown containing physical interface 790, drivers 780A_780K, RAPIs 760A_760K, virus scan module 750, multi data access modules 730, user interface 710, download module 770, network interface 775, virus definitions 490 operating system services 420, and memory buffer 430. Similar elements are chosen with similar label and reference numerals as in FIG. 4 and the description not repeated for conciseness. The remaining blocks are described below in further detail.

Multi data access module 730 provides (to virus scan module 750) universal/common library functions facilitating access of desired data in mobile phones 150A_150Z, irrespective of phone type. Universal library functions is designed facilitate data access required for virus scan. For example, multi data access module 730 may contain function calls to enable file access, SMS access, MMS access, and data source (containing information such as mobile phone type, make, model and other properties of mobile phone) access.

In one embodiment, the provided library functions include, but not limited to, OpenFile, ReadFile, WriteFile, CloseFile, GetFileSize, GetFileAttributes, DeleteFile, RenameFile, FindFirstFile, FindNextFile etc., each with self_explanatory label. Similarly, for SMS access and MMS access, the library may contain functions such as GetMessageProperties (like time stamp, number sent or received from etc.), DeleteMessage (to delete message from storage), GetSMSMessage GetMMSFile etc.

Universal library functions in turn invoke the program logics in one of RAPIs 760A_760J, depending on the mobile phone type sought to be scanned, to retrieve data from the corresponding mobile. The type of mobile device that is being scanned may be obtained from user interface 710 (based on appropriate user inputs) or through device ID sent through the physical interface 790.

Virus scan module 750 scans the content of memory buffer 430 as described in FIG. 4. Physical interface 790 provide physical connectivity to mobile phones 150A_150Z. The physical interface may represent a USB port, serial Port, ethernet port, wireless (bluetooth) port etc., through which mobile phones are connected to PC 180.

Download module 770 and network interface 775 enable mobile device to dynamically retrieve various program logics and virus definitions from the web as described in further detail in sections below. Broadly, download module 770 represents a program logic for retrieving the applicable program logics and virus definitions, and storing/replacing the same in virus scan module 750 and virus definitions 490.

On the other hand, network interface 775 provides the physical, electrical and protocol interfaces necessary for a computer to exchange data with a server over a network. In one embodiment, network interface 775 may be implemented as an ethernet interface exchanging data using Internet Protocol (IP), well known in the relevant arts.

Each driver 780A_780K provides data connectivity based on a type of driver implemented in the corresponding mobile phone 150A_150Z. For example, a mobile phone with a USB connectivity may be connected through one of drivers 780A_780K implemented with USB protocol.

Each RAPIs 760A_760K represents the set of function calls (program logics) to access the corresponding mobile phone. Each RAPIs 760A_760J perform an operation similar to the RAPI 470 described in FIG. 4. Accordingly, RAPIs 760A_760J retrieve the data/portion of file, which is eventually stored by multi-data access modules 730 to memory buffer 430. Often each mobile phone manufacturer provides a software package containing RAPI along with the mobile phone. The software package enables the access to mobile phone having the corresponding operating environment. Each software package is installed in the PC 180 as the corresponding one of RAPI 760A_760J.

In addition, for each operating environment, vendors may provide a software development kit (SDK). Software application integrating the corresponding RAPI may be developed using the SDK. SDK may be used to develop functions in the multi data access module 730.

It must be appreciated that the number and variety of viruses that affect mobile devices are increasing and evolving at a rapid rate. It may be difficult for a mobile device user to keep current the program modules and virus definitions, if they were to be made available through conventional media such as computer readable media.

However, if the user was to obtain the program modules and virus definitions from a server on which the updated versions are maintained, the user may always have access to the updated program modules and virus definitions. The manner in which a user may obtain the program modules and virus definitions from a server is described below with examples.

Another Example Environment

Figure 8:
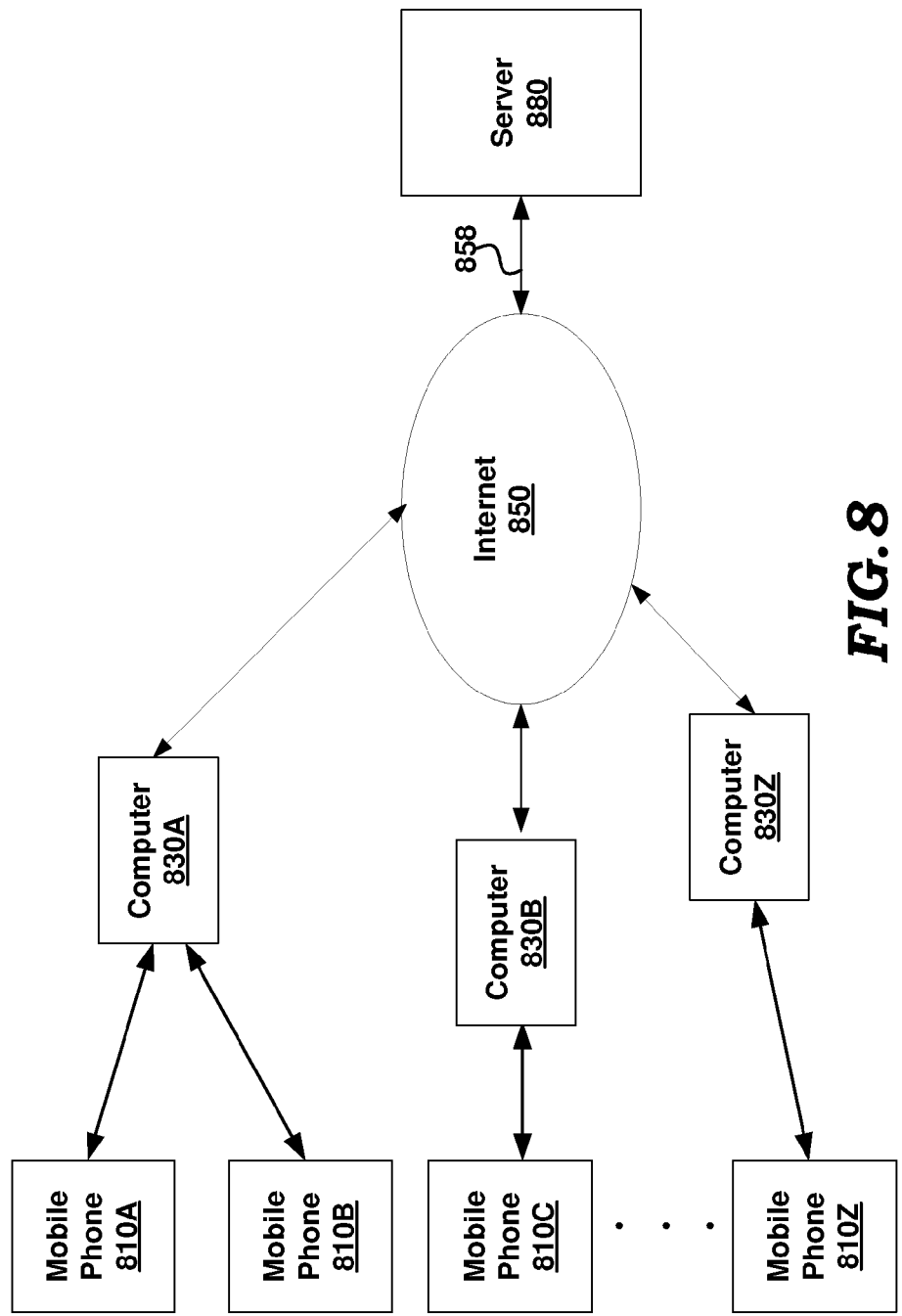
FIG. 8 is a block diagram illustrating an example environment in which a user may obtain the program modules and virus definitions for scanning a mobile device in an embodiment of the present invention.

FIG. 8 is a block diagram illustrating an example environment in which a user may dynamically obtain the program modules and virus definitions for scanning a mobile device in an embodiment of the present invention. The block diagram is shown containing mobile phones 810A-810Z, computers 830A-830Z, internet 850 and server 880. Each block is described below in detail.

Internet 850 represents a network providing connectivity between server 880 and computers 830A-830Z. Internet 850 may be implemented using protocols such as Internet Protocol well known in the relevant arts. Computers 830A-830Z and server 880 may exchange data (for example, program modules, virus definition, model of mobile devices, etc.) over internet 850.

Server 880 represents a server containing software applications capable of performing operations (for example, retrieval of program modules, virus definitions, etc.) requested by computers 830A-830Z. The data representing the program modules and virus definitions may be stored either internally within server 880 or stored on an external server (e.g., a database server). The data may be retrieved and processed as needed, and sent as a response to various operations requested by computers 830A-830Z.

Mobile phones 810A-810Z operate similarly to mobile phones 150A-150Z, described with reference to FIG. 1. As noted there, mobile phones 810A-810Z may become infected (malevolent program modules being present in a mobile phone without user consent) by viruses, through SMS, MMS, other application programs, etc. It may also happen that malevolent program modules, not capable of executing in a mobile phone because they are designed for other mobile phone environments, may also be present.

Mobile phones 810A-810Z may be connected to respective computers 803A-830Z (e.g., by USB interface, well known in the relevant arts) and scanned for both the kinds of malevolent program modules according to various aspects of the present invention, as described below with examples.

Computer to Scan Mobile Phones Using information on the Server

Figure 9:
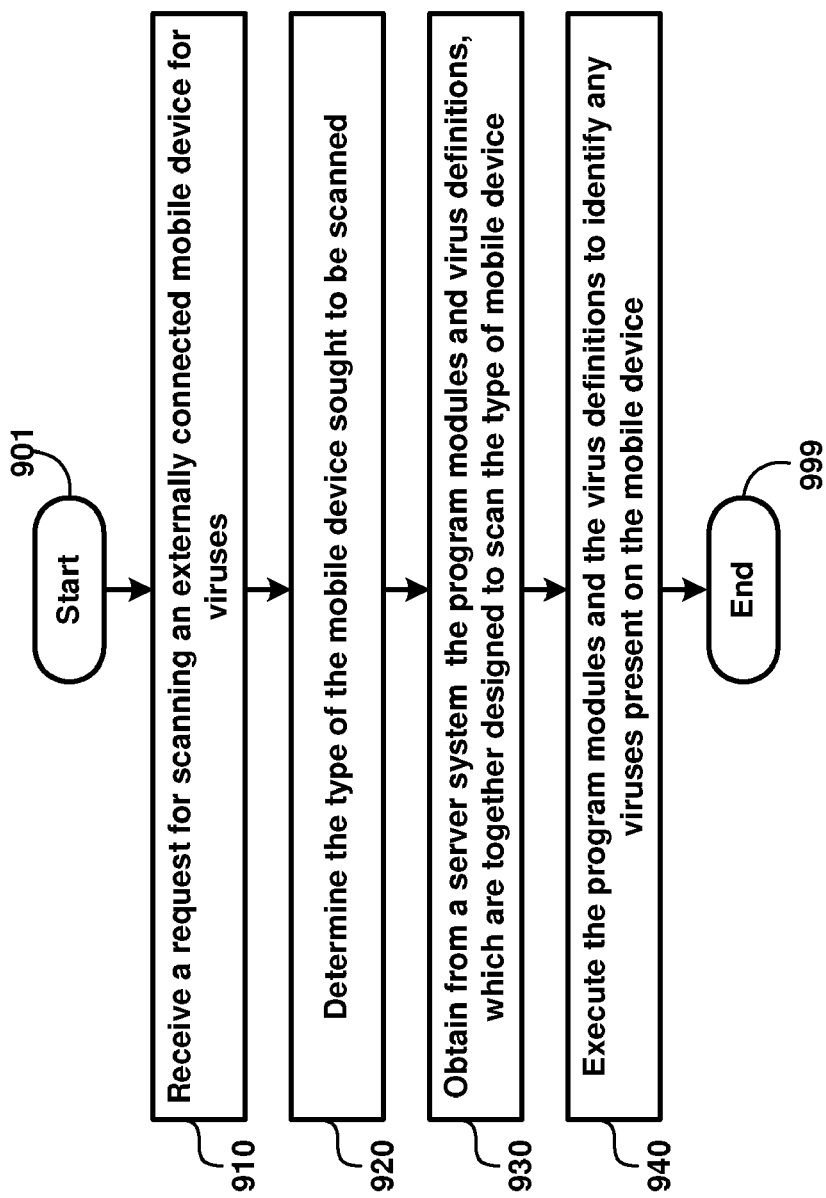
FIG. 9 is a flowchart illustrating the manner in which program modules and virus definitions may be obtained from a server and executed in a computer to identify any viruses present on a mobile device, according to an aspect of the present invention.

FIG. 9 is a flowchart illustrating the manner in which program modules and virus definitions may be obtained from a server and executed in a computer to identify any viruses present on a mobile device, according to an aspect of the present invention. The flow chart is described with respect to FIGS. 2-8 merely for illustration. However various features may be implemented in other environments as well, without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Such implementations are contemplated to be covered by several aspects of the present invention. The flow chart begins in step 901, in which control immediately passes to step 910. The description is provided, assuming that Mobile phone 810A, connected to computer 830A is to be scanned for viruses.

In step 910, computer 830A receives a request for scanning an externally connected mobile device for viruses. Mobile device 810A may be connected to computer 830A by a user using a communication port such as USB, Wired or Wireless Ethernet, Bluetooth, etc., as described in sections above. After connecting mobile device 810A to computer 830A, a user may make a request to computer 830A to scan mobile device 810A for viruses, for example, using a graphical user interface or a keyboard, etc.) implemented based on user interface 710.

In step 920, computer 830A determines the type of the mobile device sought to be scanned. The determination may be performed either using manual (i.e., based on user inputs) or automatically (e.g., based on various plug-and-play techniques, well known in the relevant arts). The type may be specified by identifiers of manufacturer and/or model number (e.g., Nokia N60). However, alternative information such as the operating environment (operating system, internal processor used, memory size, SIM card details) may be provided, which facilitates identification of the appropriate software modules and virus definitions, as described below.

In step 930, computer 830A obtains from server 880 the program modules and virus definitions, which are together designed to scan the type of mobile device. Download module 770 may send the type of mobile device determined in step 920 and a request for respective program modules and virus definitions, to server 880 over internet 850. Server 880 may retrieve the program modules and virus definitions applicable to the mobile device type specified and send (upload) the files over internet 850 to computer system 830A.

Download module 770 may receive from server 880 the program modules and virus definitions corresponding to the mobile device type sent and stores them in a storage. For example, the virus definitions may be stored in virus definitions 490 either to replace previously stored portions or as additive components. The program modules may consist of various modules such as virus scan module 750, driver modules (for example drivers 780A to 780K, etc.) required to access files from the mobile device, etc. The received data may be stored in appropriate locations to respectively form virus scan module 750, driver modules 780A to 780K, etc.

It should be appreciated that only those definitions and program modules as applicable to the model of the mobile phone are received.

In step 940, computer 830A executes the program modules using the virus definitions to identify any viruses present on the mobile device. In an embodiment, the virus definitions and the program modules are received in the form of ActiveX components (in technologies provided by Microsoft Corporation). Accordingly, computer 803A may be designed to support such ActiveX technology. The reception of the components and execution of the same when required, can be performed in a known way.

Thus, if there are any driver modules in the downloaded program modules, operating system services 420 may perform appropriate actions to form the required ones of drivers 780A-780K from the received data. Virus scan module (for example, virus scan module 750) may then be executed to scan mobile device 810A for viruses as described in sections above. A file or a portion of a file in mobile device 810A may be retrieved, stored in memory (for example memory buffer 430) and scanned for viruses using virus definitions 490, as described above. The scan may be continued for all the files on mobile device 810A. If a file is found to be infected with a virus, the file may be cleaned, repaired or deleted as noted above.

The flowchart ends in step 999. Computer systems 830A-830Z obtain the program modules and virus definitions from server 880, as described above. The manner in which a server may provide the program modules and virus definitions to a computer, in response to a request from the computer is described below with examples.

Server Providing Program Modules and Virus Definitions to a Computer

Figure 10:
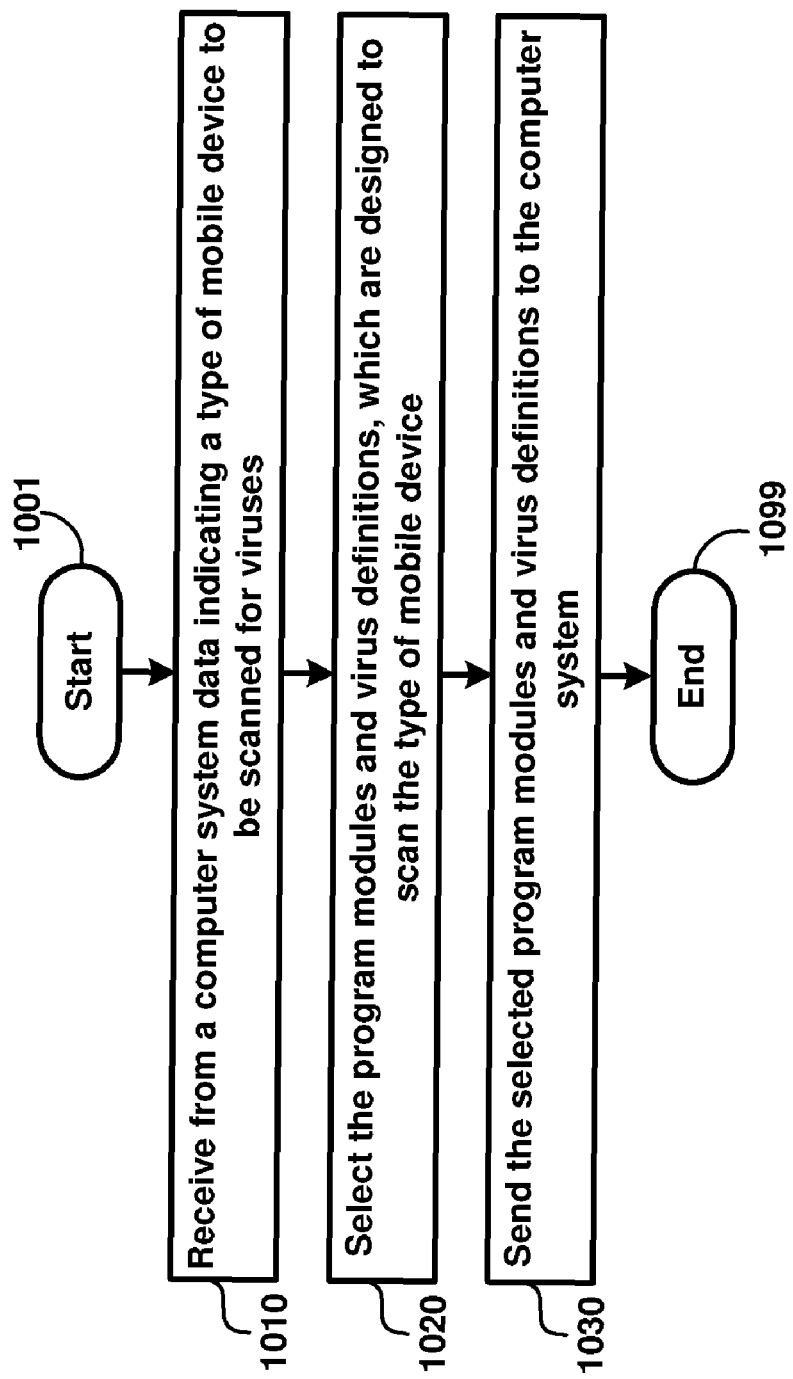
FIG. 10 is a flowchart illustrating the manner in which a server provides program modules and virus definitions to a computer, to identify any viruses present on a mobile device, according to an aspect of the present invention.

FIG. 10 is a flowchart illustrating the manner in which a server provides program modules and virus definitions to a computer, to identify any viruses present on a mobile device, according to an aspect of the present invention. The flow chart is described with respect to FIGS. 2-9 merely for illustration. However various features may be implemented in other environments as well, without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Such implementations are contemplated to be covered by several aspects of the present invention. The description is provided, assuming that Mobile phone 810A, connected to computer 830A is to be scanned for viruses. The flow chart begins in step 1001, in which control immediately passes to step 1010.

In step 1010, server 880 receives from a computer system data indicating a type of mobile device to be scanned for viruses. For example, computer 830A may send the type of mobile device 810A (connected to computer 830A for scanning for viruses), determined in step 920, to server 880 over Internet 850.

In step 1020, server 880 selects the program modules and virus definitions, which are designed to scan the type of mobile device. Server 880 maintains a library of program modules and virus definitions in a data storage (which may be internal to server 880 or external, for example in a database server). The library contains a number of program modules and virus definitions which may be used to scan different types of mobile devices. Server 880 selects the program modules and virus definitions pertaining to the type of mobile device (received from computer 830A).

In step 1030, server 880 sends the selected program modules and virus definitions to the computer system. Server 880 sends the selected (pertaining to the received type of mobile device) program modules and virus definitions to computer 830A over internet 850. Computer 830A may receive and execute the program modules and virus definitions to scan mobile device 810A as described above. As noted above, the program modules and virus definitions may be packaged as ActiveX components and sent in one embodiment. The flowchart ends in step 1099.

The description is continued with respect to the details of an example server in an embodiment of the present invention.

Example Server

Figure 11:
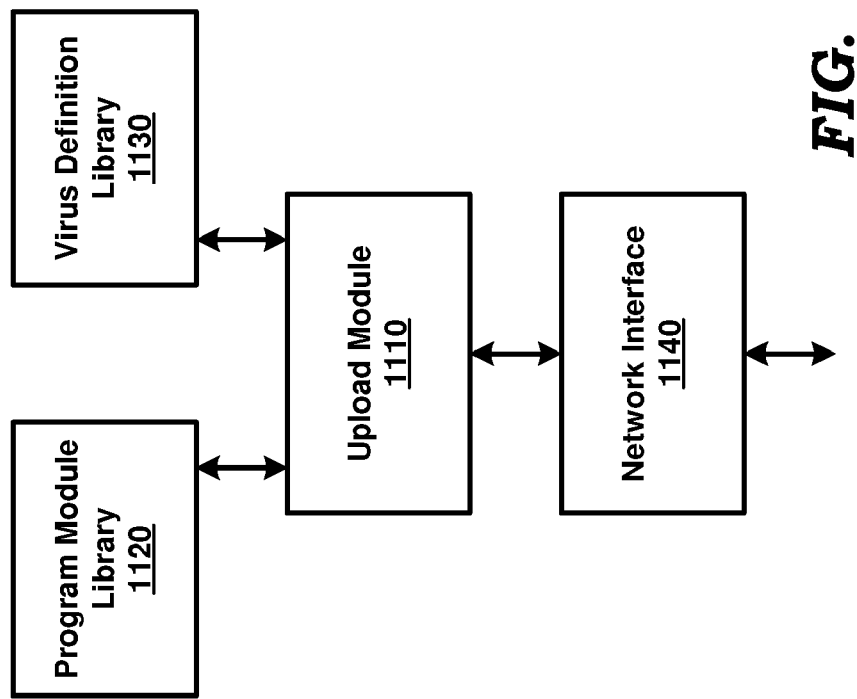
FIG. 11 is a block diagram representing various functional blocks of a server in an embodiment.

FIG. 11 is a block diagram representing various functional blocks of server 880 in an embodiment of the present invention. The block diagram is shown containing upload module 1110, program module library 1120, virus definition library 1130 and network interface 1140. Each block is described below in further detail.

Program module library 1120 contains program modules such as a virus scan module 750, driver modules (for example drivers 780A to 780K, etc.) required to access files from a mobile device, etc., corresponding to each of the mobile device types it is designed to scan for viruses. Thus, assuming there are 4 makes provided by each of 5 manufacturers, the program modules and virus definitions for all the 20 types may be stored in the library.

Virus definition library 1130 contains virus definitions (for example, virus definitions 490) corresponding to each of the mobile device types it is designed for.

Server 880 receives a type of mobile device and a request for program modules and virus definitions corresponding to that type of mobile device, from a computer such as computer 830A. Server 880 selects the corresponding program modules from program module library 1120 and virus definitions from virus definition library 1130 and provides them over a network (for example internet 850) to the computer (such as computer 830A) making the request.

Network interface 1140 provides the physical, electrical and protocol interfaces necessary for server 880 to exchange data with computers such as computers 830A-830Z over a network such as internet 850

Upload module 1110 represents a set of program logic for receiving a mobile device type from a computer such as computer 830A, select program modules and virus definitions corresponding to the received mobile device type from a respective program module library such as program module library 1120 and a virus definition library such as virus definition library 1130 and upload (send) the selected program modules and virus definitions to computer 830A over internet 850.

It should be appreciated that the features described above can be implemented in a combination of one or more of hardware, software and firmware. The description is continued with respect to an embodiment in which the features are operative by execution of software instructions as described below in further detail.

Software Implementation

Figure 12:
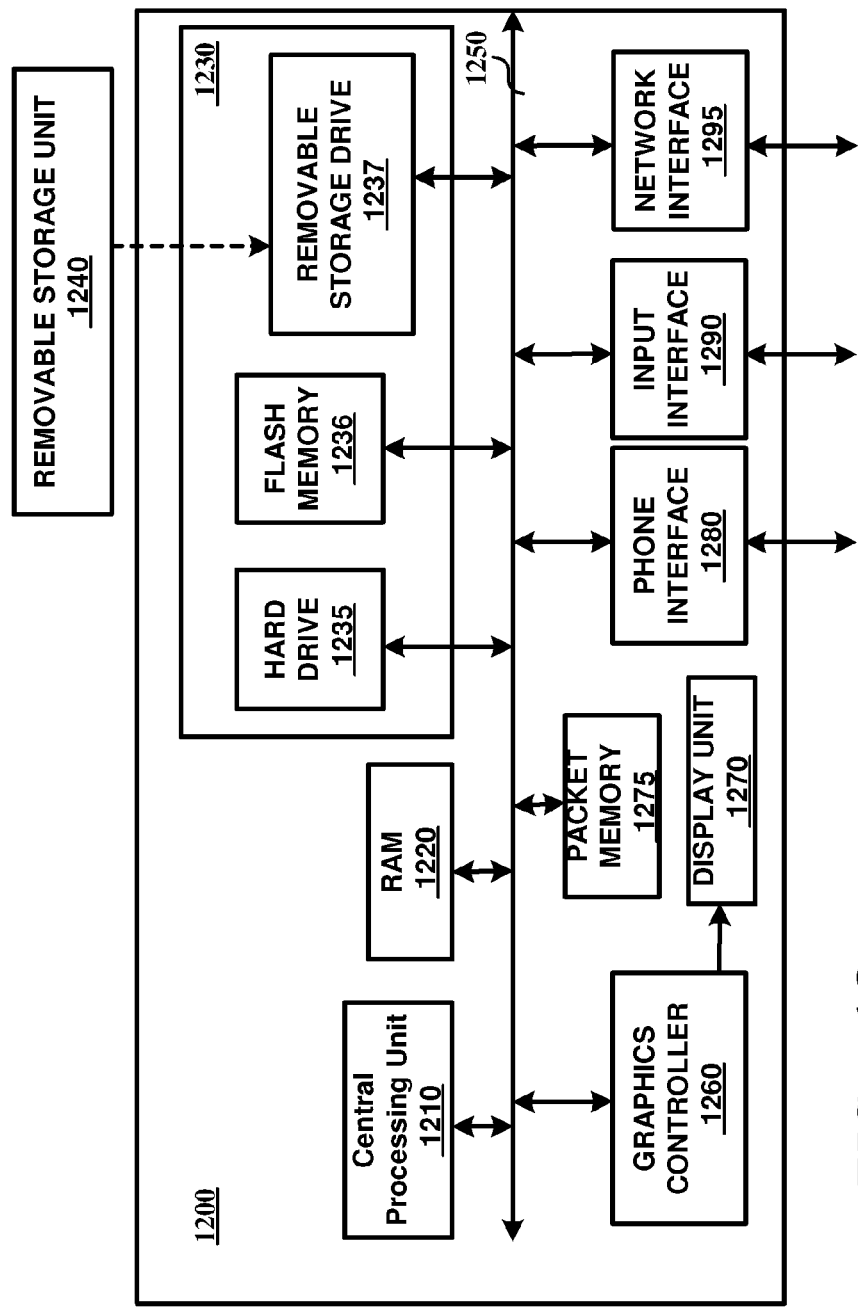
FIG. 12 is a block diagram illustrating the details of a digital processing system in which several aspects of the present invention are operative upon execution of software instructions in one embodiment.

FIG. 12 is a block diagram illustrating the details of digital processing system 1200 in which various aspects of the present invention are operative by execution of appropriate software instructions. In one embodiment, digital processing system 1200 may correspond to any one of computer 180, computers 830A-830Z, and server 880. The example environment is shown containing only representative systems for illustration. However, real world environments may contain more/fewer/different systems/components as will be apparent to one skilled in the relevant arts. Implementations in such environments are also contemplated to be within the scope and spirit of various aspects of the present invention.

Digital processing system 1200 may contain one or more processors (such as a central processing unit (CPU) 1210), random access memory (RAM) 1220, secondary memory 1230, graphics controller 1260, display unit 1270, phone interface 1280, input interface 1290, and network interface 1295. All the components except display unit 1270 may communicate with each other over communication path 1250, which may contain several buses as is well known in the relevant arts. The components of FIG. 12 are described below in further detail.

CPU 1210 may execute instructions stored in RAM 1220 to provide several features of the present invention. CPU 1210 may contain multiple processing units, with each processing unit potentially being designed for a specific task. Alternatively, CPU 1210 may contain only a single general purpose processing unit. RAM 1220 may receive instructions from secondary memory 1230 using communication path 1250.

Graphics Processor Unit (GPU) 1260 generates display signals (e.g., in RGB format) to display unit 1270 based on data/instructions received from CPU 1210. Display unit 1270 contains a display screen to display the images defined by the display signals.

Input interface 1290 may correspond to a keyboard and a pointing device (e.g., touch pad, mouse), which may be used to specify various user actions (start scanning, enter mobile device type, confirmation of deleting a virus infected file, etc.) described above.

The images displayed on the display screen, together with input interface 1290 forms the basis for various user interface features provided according to various aspects of the present invention described above.

Phone interface 1280 may enable system 1200 to send/receive data to the phones and may be viewed as containing physical interface 790 and 399 described above. Phone interface 1280 may be present only computer systems, but not in the server, and can be implemented in a known way.

Network interface 1295 provides connectivity to a network such as internet 850, and may be used to communicate with other connected systems (such as other computers 180, 830A-830Z, mobile phones/devices, server 880, etc.).

Packet memory 1275 stores (queues) packets (representing voice or data) waiting to be forwarded (or otherwise processed).

Secondary memory 1230 may contain hard drive 1235, flash memory 1236, and removable storage drive 1237. Secondary memory 1230 may store the data (for example virus definitions) and software instructions (such as program modules for scanning for viruses), which enable digital processing system 1200 to provide several features in accordance with the present invention.

Some or all of the data and instructions may be provided on removable storage unit 1240, and the data and instructions may be read and provided by removable storage drive 1237 to RAM 1220. Floppy drive, magnetic tape drive, CD_ROM drive, DVD Drive, Flash memory, removable memory chip (PCMCIA Card, EPROM) are examples of such removable storage drive 1237.

Removable storage unit 1240 may be implemented using medium and storage format compatible with removable storage drive 1237 such that removable storage drive 1237 can read the data and instructions. Thus, removable storage unit 1240 includes a computer readable storage medium having stored therein computer software and/or data. However, the computer (or machine, in general) readable storage medium can be in other forms (e.g., non removable, random access, etc.).

In this document, the term "computer program product" is used to generally refer to removable storage unit 1240 or hard disk installed in hard drive 1235. These computer program products are means for providing software to digital processing system 1200. CPU 1210 may retrieve the software instructions, and execute the instructions to provide various features of the present invention described above.

CONCLUSION

While various embodiments of the present invention have been described above, it should be understood that they have been presented by way of example only, and not limitation. Thus, the breadth and scope of the present invention should not be limited by any of the above described embodiments, but should be defined only in accordance with the following claims and their equivalents.

What is claimed is:

1. A method of scanning a mobile device for existence of a set of viruses, said method comprising:
   establishing, from a system, communication with said mobile device;
   determining, in said system, a portion of a file required to scan said file present on said mobile device, wherein said portion is determined by a program logic underlying a virus scan software;
   retrieving, by said system, said portion from said file on said mobile device;
   scanning, in said system, said portion to determine whether any of said set of viruses are present on said file;
   determining in said system, whether another portion of said file is required to continue scan according to said program logic;
   retrieving by said system from said mobile device, said another portion by sending an identifier of said another portion, and repeating said scanning if said determining indicates that said another portion is required,
   wherein said system is external to said mobile device,
   whereby said entire file need not be retrieved into said system to determine existence of said set of virus programs.

2. The method of claim 1, wherein said mobile device is of a first operating environment and a first virus contained in said set of viruses is not designed to execute in said first operating environment, said method further comprising:
   receiving in said system information indicating that said mobile device is of said first operating environment,
   wherein said scanning detects the existence of said first virus in said file even though said first virus is designed not to execute in said first operating environment indicated by said received information.

3. The method of claim 2, further comprising removing said first file from said mobile device upon detection of said first virus in said file.

4. The method of claim 1, wherein said retrieving comprises sending a first request to provide said portion of said file according to an Application Programming Interface (API) and sending a second request to provide said another portion of said file according to said API.

5. The method of claim 1, wherein said mobile device is a mobile phone.

6. A method of detecting a plurality of mobile devices each having a corresponding one of a plurality of operating environments and exposure to execution of a corresponding one of a plurality of sets of viruses, said method being implemented in a single scan application on a system external to said plurality of mobile devices, said method comprises:

implementing a plurality of device interfaces, wherein each of said plurality of device interfaces comprises a respective Application Programming Interface (API) to perform operations related to data in the form of files stored according to corresponding one of said plurality of operating environments on the respective mobile devices;

receiving information indicating a first operating environment present on a first mobile device sought to be scanned, said first operating environment being comprised in said plurality of operating environments and said first mobile device being comprised in said plurality of mobile devices, a first device interface contained in said plurality of device interfaces having the ability to interface with said first mobile device;

sending commands via the API of said first interface to access content of a file present on said first mobile device; and scanning said file for existence of viruses.

7. The method of claim 6, providing a common interface using which said single scan application can request said file irrespective of the operating environment of said plurality of mobile devices, wherein each of said plurality of interfaces is designed to interface with said common interface also.

8. The method of claim 7, wherein said scanning scans said first mobile device for each of said plurality of sets of viruses.

9. A non-transitory computer readable medium carrying one or more sequences of instructions to cause a digital processing system to detect a plurality of mobile devices each having a corresponding one of a plurality of operating environments and exposure to execution of a corresponding one of a plurality of sets of viruses, said computer readable medium carrying a single scan application, said digital processing system being external to said plurality of mobile devices, wherein execution of said one or more sequences of instructions by one or more processors contained in said digital processing system causes said one or more processors to perform the actions of:

implementing a plurality of device interfaces, wherein each of said plurality of device interfaces comprises a respective Application Programming Interface (API) to perform operations related to data in the form of files stored according to corresponding one of said plurality of operating environments on the respective mobile devices;

receiving information indicating a first operating environment present on a first mobile device sought to be scanned, said first operating environment being comprised in said plurality of operating environments and said first mobile device being comprised in said plurality of mobile devices;

identifying a first device interface contained in said plurality of device interfaces having the ability to interface with said first mobile device;

sending commands related to file operations via the API of said first interface in response to said identifying to access content of a file present on said first mobile device; and scanning said file for existence of viruses.

10. A method of scanning a mobile device for existence of a plurality of viruses, said method comprising:

receiving in a system, a request for scanning said mobile device, said request being received from a user of said system which is external to said mobile device;

determining in said system, a type of said mobile device;

obtaining in said system, from a server a plurality of program modules and virus definitions together designed to scan said type of said mobile device, wherein said server is designed to maintain program modules and virus definitions for many types of mobile device, wherein the specific program modules and virus definitions corresponding to said type are obtained based on said determining; and executing, in said system, said plurality of program modules based on said virus definitions to identify viruses present on said mobile device, wherein said determining, said obtaining and said executing are performed in response to receiving of said request for scanning, wherein said system and said server are separate processing systems external to said mobile device.

11. A method of providing a plurality of program modules and virus definitions from a server to a system to scan a mobile device for existence of a plurality of viruses, said system being external to said mobile device, said method being performed in said server, said method comprising:

receiving a type of said mobile device on a network;

selecting said plurality of program modules and virus definitions designed to scan said type of said mobile device; and sending said plurality of program modules and virus definitions to said system on said network.

* * * * *